US006567808B1

(12) United States Patent
Eschelbeck et al.

(10) Patent No.: US 6,567,808 B1
(45) Date of Patent: May 20, 2003

(54) SYSTEM AND PROCESS FOR BROKERING A PLURALITY OF SECURITY APPLICATIONS USING A MODULAR FRAMEWORK IN A DISTRIBUTED COMPUTING ENVIRONMENT

(75) Inventors: Gerhard Eschelbeck, Santa Clara, CA (US); Andreas Schlemmer, Leonding (AT); Peter Blaimschein, Steyr (AT)

(73) Assignee: Networks Associates, Inc., Santa Clara, CA (US)

(*) Notice: Subject to any disclaimer, the term of this patent is extended or adjusted under 35 U.S.C. 154(b) by 0 days.

(21) Appl. No.: 09/540,973

(22) Filed: Mar. 31, 2000

(51) Int. Cl.[7] .............................................. G06F 17/30
(52) U.S. Cl. ............................................ 707/10; 707/9
(58) Field of Search ............................. 707/1, 2, 9, 10; 709/202, 223, 217

(56) References Cited

U.S. PATENT DOCUMENTS

| 5,655,081 | A | * | 8/1997 | Bonnell et al. | ............. | 709/202 |
| 5,872,931 | A | * | 2/1999 | Chivaluri | .................... | 709/223 |
| 5,958,010 | A | * | 9/1999 | Agarwal et al. | ............ | 709/224 |
| 6,332,163 | B1 | * | 12/2001 | Bowman-Amuah | ......... | 709/231 |

OTHER PUBLICATIONS

M. Pietrek, "Learn System–Level Win32 Coding Techniques by Writing an API Spy Program," vol. 9, No. 12, Microsoft Systems Journal, Microsoft Press (Dec. 1994).

T. Fraser et al., "Hardening COTS Software with Generic Software Wrappers," Proc. of the 1999 IEEE Symp. on Security and Privacy, IEEE, Inc. (1999).

* cited by examiner

Primary Examiner—Diane D. Mizrahi
Assistant Examiner—Yicun Wu
(74) Attorney, Agent, or Firm—Patrick J. S. Inouye; Christopher J. Hamaty

(57) ABSTRACT

A system and process for brokering a plurality of security applications using a centralized broker in a distributed computing environment is described. A centralized broker is executed on a designated system within the distributed computing environment. A set of snap-in components are provided with each performing a common management task sharable by a plurality of security applications. A console interface is exposed from the centralized broker. The console interface implements a plurality of browser methods which each define an browser function which can be invoked by each snap-in component. A set of snap-in interfaces are exposed from each snap-in component. Each snap-in interface implements a plurality of service methods which each define a user-interface function which can be invoked by the centralized broker. One or more security applications are brokered through the centralized broker. Each security application is interfaced to the centralized broker through the snap-in components. Each security application is managed by invoking at least one such browser method via the console interface. A plurality of the security applications are centrally serviced by invoking at least one such service method via at least one such snap-in interface.

28 Claims, 13 Drawing Sheets

SYSTEM AND PROCESS FOR BROKERING A PLURALITY OF SECURITY APPLICATIONS USING A MODULAR FRAMEWORK IN A DISTRIBUTED COMPUTING ENVIRONMENT

CROSS-REFERENCE TO RELATED APPLICATION

This patent application is related to commonly-assigned pending U.S. patent applications Ser. No. 09/541,355, entitled "System And Process For Maintaining A Plurality Of Remote Security Applications Using A Modular Framework In A Distributed Computing Environment," filed Mar. 31, 2000, pending and Ser. No. 09/154,365, entitled "System And Process For Reporting Network Events With A Plurality Of Hierarchically-Structured Databases In A Distributed Computing Environment," filed Mar. 31, 2000, pending, the disclosures of which are incorporated herein by reference.

FIELD OF THE INVENTION

The present invention relates in general to security application management and, in particular, to a system and process for brokering a plurality of security applications using a modular framework in a distributed computing environment.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web, and to allow outside users access to select corporate resources for the purpose of completing limited transactions or data transfer.

Most current internetworks and intranetworks are based on the Transmission Control Protocol/Internet Protocol (TCP/IP) suite, such as described in W. R. Stevens, "TCP/IP Illustrated," Vol. 1, Ch. 1, Addison-Wesley (1994), the disclosure of which is incorporated herein by reference. Computer systems and network devices employing the TCP/IP suite implement a network protocol stack, which includes a hierarchically structured set of protocol layers. Each protocol layer performs a set of pre-defined functions as specified by the official TCP/IP standards set forth in applicable Requests for Comment (RFC).

The growth of distributed computing environments, particularly TCP/IP environments, has created an increased need for computer security, especially for protecting operating system and application software and stored data. A wide range of security applications are needed to ensure effective security. For example, firewalls and intrusion detection systems are necessary to combat would-be network intruders, the so-called "hackers," of the networking world. Similarly, antivirus scanning applications must be regularly executed and, equally importantly, updated, to detect and eradicate "malware" consisting of computer viruses, Trojan horses, and other forms of unauthorized content.

In addition to these forms of reactive security applications, proactive security applications are increasingly being adopted to prevent security breaches from happening. For instance, vulnerability scanners probe and identify potential security risks and concerns. Likewise, "honey pot" or decoy host systems create the illusion of a network of relatively unguarded, virtual hosts within which a would-be hacker can be tracked and identified.

While these types of security applications form a powerful arsenal of defensive and offensive security tools, configuring and managing these security tools is a time-consuming and complex task. Even within a given site, security policies may vary and require different settings depending upon the platform and organizational needs. Moreover, the time required to properly configure and maintain a network site grows substantially with each installed platform. For instance, a detection signature must be installed on each networked system for every newly-discovered computer virus. Installing these signatures alone can take a substantial amount of time. Finally, individual systems, particularly when left with open administrative permissions, can depart from the actual security policy in effect, thereby by-passing the security measures already in place and unwittingly placing the network in jeopardy.

On-going maintenance notwithstanding, defensive security applications typically generate logs of network events. In the same way, offensive security applications generate reports of vulnerabilities and similar findings. These logs and reports can be extremely voluminous, potentially to the point of data saturation. A single report for an average size corporate network can easily span several hundred pages, the bulk of which may never be read or used. Moreover, each security application tends to adopt a proprietary log or report format which duplicates reporting functionality through an application-specific approach. These proprietary approaches result in the duplication of efforts and waste needless computational resources.

Therefore, there is a need for an approach to providing a centralized management framework for security applications. Such an approach would preferably provide an integrated broker into which a variety of services, such as event analysis and reporting, could be flexibly installed for use by plurality of security applications.

There is a further need for a security application framework providing a common user interface for configuring and managing both local and remote security applications.

SUMMARY OF THE INVENTION

The present invention provides a system and process for interfacing and brokering security applications using a security management interface framework. A centralized broker is interfaced to a set of snap-in components in a layered, hierarchical structure. A root snap-in component provides the basic user interface and management infrastructure and is surrounded by top-level snap-in components which provide security application-independent services. The top-level snap-in components are surrounded by one or more layers of security application snap-in components. In addition, security applications running on client systems can be configured and managed through an agent communication snap-in service.

An embodiment of the present invention is a system and process for brokering a plurality of security applications using a centralized broker in a distributed computing environment. A centralized broker is executed on a designated system within the distributed computing environment. A set of snap-in components are provided with each performing a common management task sharable by a plurality of security applications. A console interface is exposed from the centralized broker. The console interface implements a plurality of browser methods which each define an browser function which can be invoked by each snap-in component. A set of snap-in interfaces are exposed from each snap-in component. Each snap-in interface implements a plurality of service methods which each define a user-interface function which can be invoked by the centralized broker. One or more security applications are brokered through the centralized broker. Each security application is interfaced to the centralized broker through the snap-in components. Each security application is managed by invoking at least one such browser method via the console interface. A plurality of the security applications are centrally serviced by invoking at least one such service method via at least one such snap-in interface.

In a further embodiment of the present invention, a namespace is provided as a snap-in component to the centralized broker for remotely configuring and managing security applications on remote client systems.

In a still further embodiment of the present invention, a hierarchically structured set of event databases can be associated with the centralized broker. Event data is cascaded from child event databases to a root event database for analysis and reporting.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
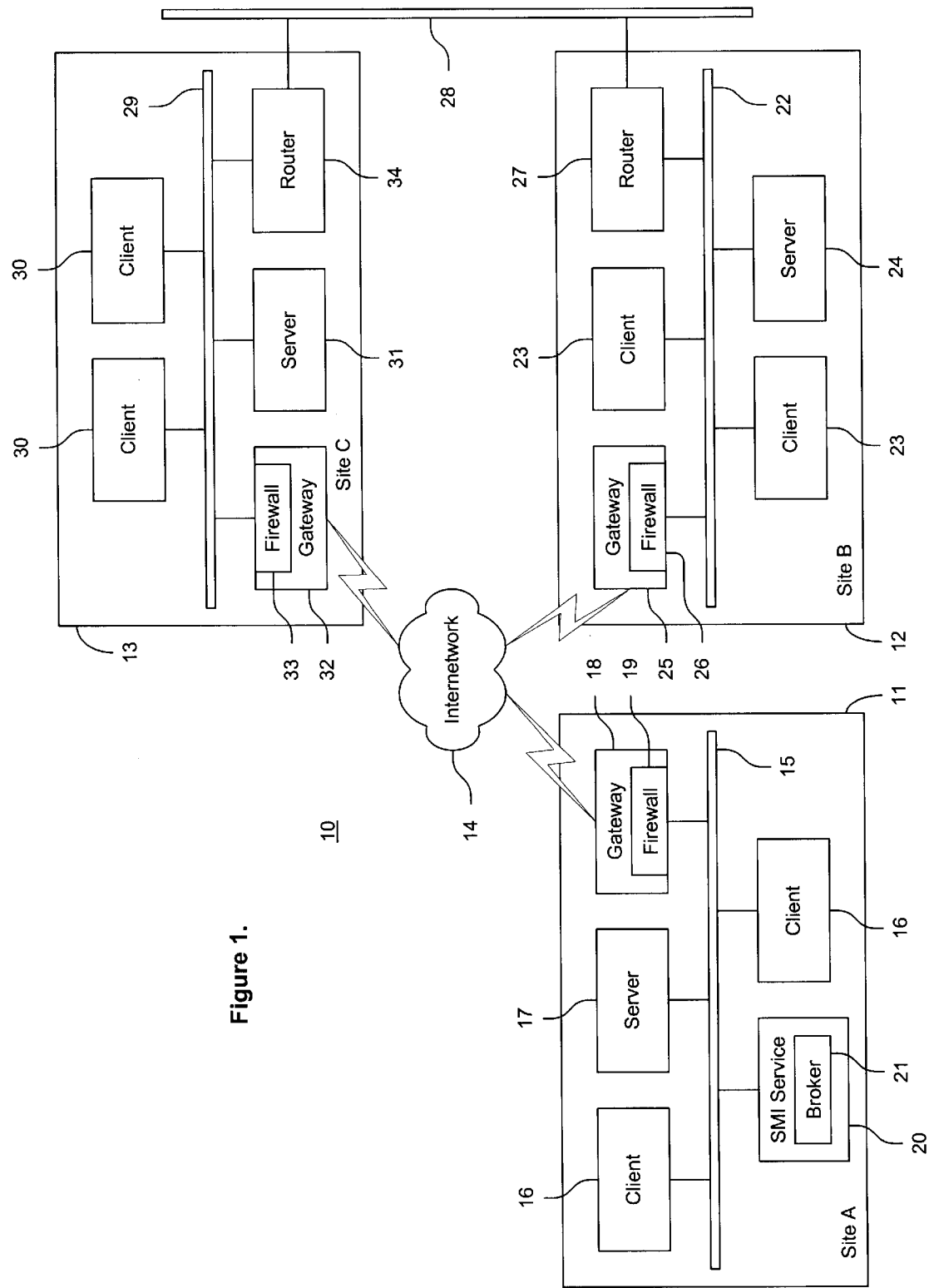
FIG. 1 is a functional block diagram showing a system for brokering a plurality of security applications using a modular framework in a distributed computing environment in accordance with the present invention.

FIG. 1 is a functional block diagram showing a system 10 for brokering a plurality of security applications using a modular framework in a distributed computing environment in accordance with the present invention. A plurality of networked computing sites, including Site "A" 11, Site "B" 12 and Site "C" 13, are interconnected via an internetwork 14, such as the Internet. Each site 11, 12, 13, includes an intranetwork 15, 22, 29, respectively, over which a plurality of networked resources are interconnected. For instance, Site "A" 11 includes a plurality of client systems 16 and a network server system 17. Individual security applications (not shown) are executed on the client systems 16 and network server system 17. The intranetwork 15 is interconnected to the internetwork 14 through a gateway 18 which includes a firewall ("FW")19.

In addition, Site "A" 11 includes a security management interface ("SMI") service 20 upon which a centralized broker 21 is executed, as further described below with reference to FIG. 2. The security management interface service 20 provides the infrastructure necessary for brokering security applications running on a plurality of clients, integrating snap-in components, accessing a namespace, embedding user interface elements, and handling window messages. The security management interface service 20 could also be run concurrently on several systems for redundancy and load sharing. One centralized broker 21 would be designated as a master centralized broker which would synchronize configuration and database information to backup security management interface services. If the master security management interface service became unavailable, the backup security management interface services would take over managing the security applications.

Similarly, Site "B" 12 includes a plurality of client systems 23, a network server system 24, and a gateway 25 with a firewall 26 and Site "C" 13 likewise includes a plurality of clients 30, a network server system 31, and a gateway 32 with a firewall 33. In addition, Site "B" 12 and Site "C" 13 are further interconnected via a dedicated high-speed network link 28 which is interfaced to intranetwork 22 and intranetwork 29 via routers 27 and 34, respectively. Other network topologies and configurations of networks, subnetworks and computational resources are feasible, including various combinations of networking hardware, such as routers, hubs, bridges, gateways and similar devices.

The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the intranetworks 11, 12, 13 and internetwork 14 implement a Transmission Control Protocol/Internet Protocol (TCP/IP) network stack protocol implementation.

In the described embodiment, a security management interface service 20 suitable for use with the present invention is the Security Management Interface included as part of the CyberCop Monitor network security application, licensed by Network Associates, Inc., Santa Clara, Calif. The Security Management Interface framework includes a single console window from which heterogeneous security applications executed on both local and remote systems can be managed. The console also includes the ability to connect to remote systems via agents, monitor security application activity, change settings, generate reports, and control user access. In addition, through the use of a namespace and a repository, the Security Management Interface framework can be used to install and configure security applications on both local and remote systems from a centralized system. As well, security results can be collected into event databases on remote systems and retrieved into a central event database for analysis and reporting.

Figure 2:
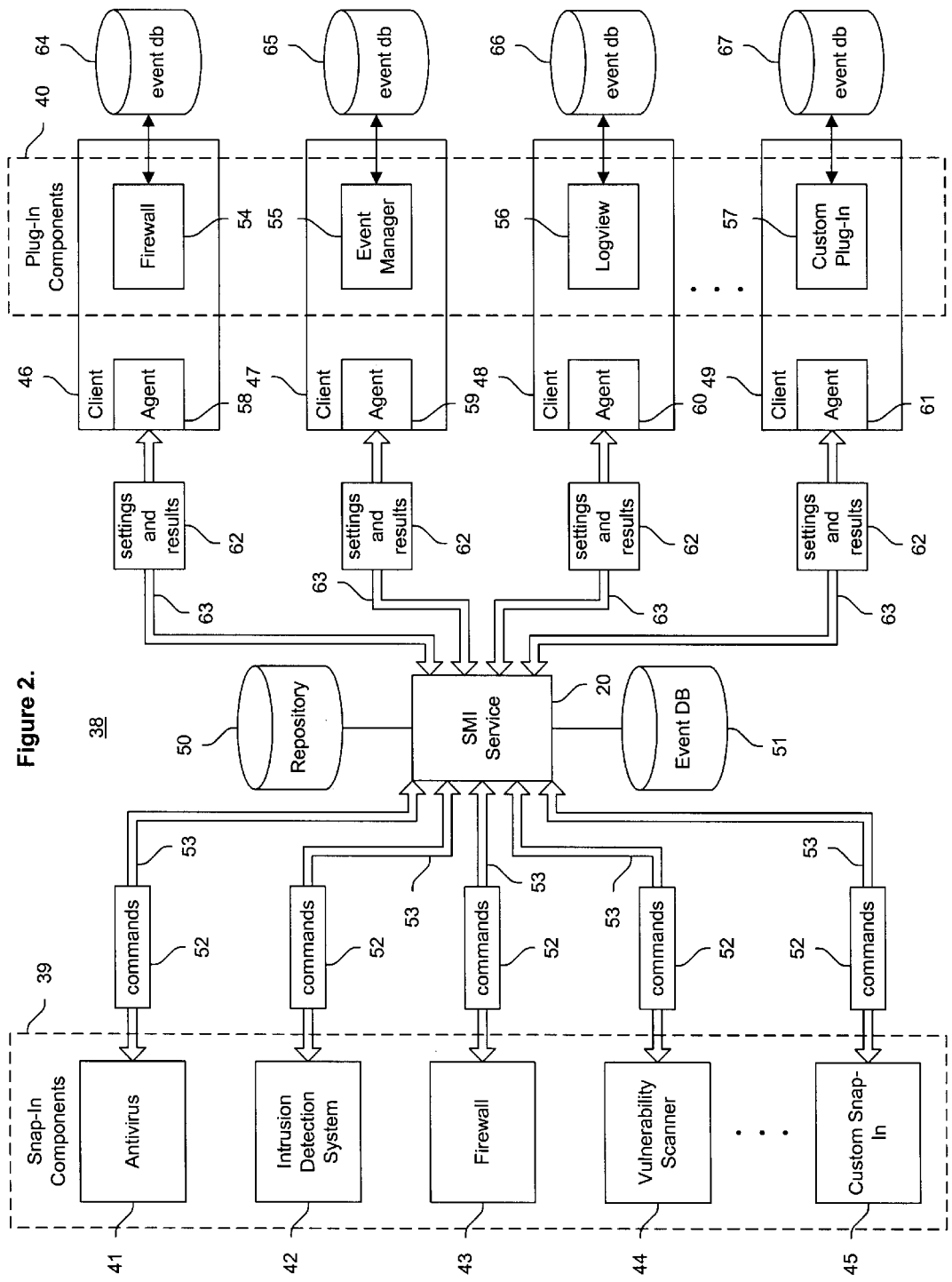
FIG. 2 is a process diagram showing the flow of information through the system of FIG. 1.

FIG. 2 is a process diagram 38 showing the flow of information through the system 10 of FIG. 1. Generally, the security management interface service 20 provides a basic user interface. Commands 52 flow from a set of snap-in components 39 to a set of plug-in components 40 running on clients via the security management interface service 20. In turn, the plug-in components 40 return settings and results 62 also via the security management interface service 20. The plug-in components 40 specialize in providing specific services, which, by way of example, can include an antivirus scanner 41, intrusion detection system 42, firewall 43, vulnerability scanner 44, or a custom security application snap-in component 45. The plug-in components 40 control local security applications and configure data on behalf of their corresponding snap-in component 39. By way of example, the plug-in components 40 can include a firewall 54, event manager 55, log viewer 56, or a custom security application plug-in component 57.

Information flows through the system 10 in accordance with pre-defined programmatic interfaces. The security management interface service 20 and each of the snap-in components 39 expose application programming interfaces (APIs) 53 through which are implemented browser and user interface methods, respectively. The security management interface service 20 interfaces to local and remote clients 46, 47, 48, 49 using an authenticated connection 63 over which are exchanged encrypted packets 62. Each client 46, 47, 48, 49 implements an agent 58, 59, 60, 61, respectively, which provides a communication component for a corresponding plug-in component 40.

In a further embodiment of the described invention, individual clients 46, 47, 48, 49 can store network event data into local event databases 64, 65, 66, 67, respectively. The individual event databases 64, 65, 66, 67 can be hierarchically structured and network event data cascaded upwards into successive levels for eventual logging into a root event database 51 associated with the security management interface service 20. A system and method for providing a hierarchically-structured event database in a security application management framework is described in the related, commonly-assigned U.S. patent application Ser. No. 09/541,365, entitled "System And Process For Reporting Network Events With A Plurality Of Hierarchically-Structured Databases In A Distributed Computing Environment," filed Mar. 31, 2000, pending, the disclosure of which is incorporated herein by reference.

In a still further embodiment of the described invention, a special snap-in component 39, known as a namespace (not shown), works in conjunction with repository 50 to manage remote security applications executing on the individual clients 46, 47, 48, 49. The namespace and repository 50 enable the security applications to be remotely configured and managed from the centralized broker 21 (shown in FIG. 1) running on the security management interface service 20. A system and method for providing a namespace and repository in a security application management framework is described in the related, commonly-assigned U.S. patent application Ser. No. 09/541,355, entitled "System And Process For Maintaining A Plurality Of Remote Security Applications Using A Modular Framework In A Distributed Computing Environment," filed Mar. 31, 2000, pending, the disclosure of which is incorporated herein by reference.

Figure 3:
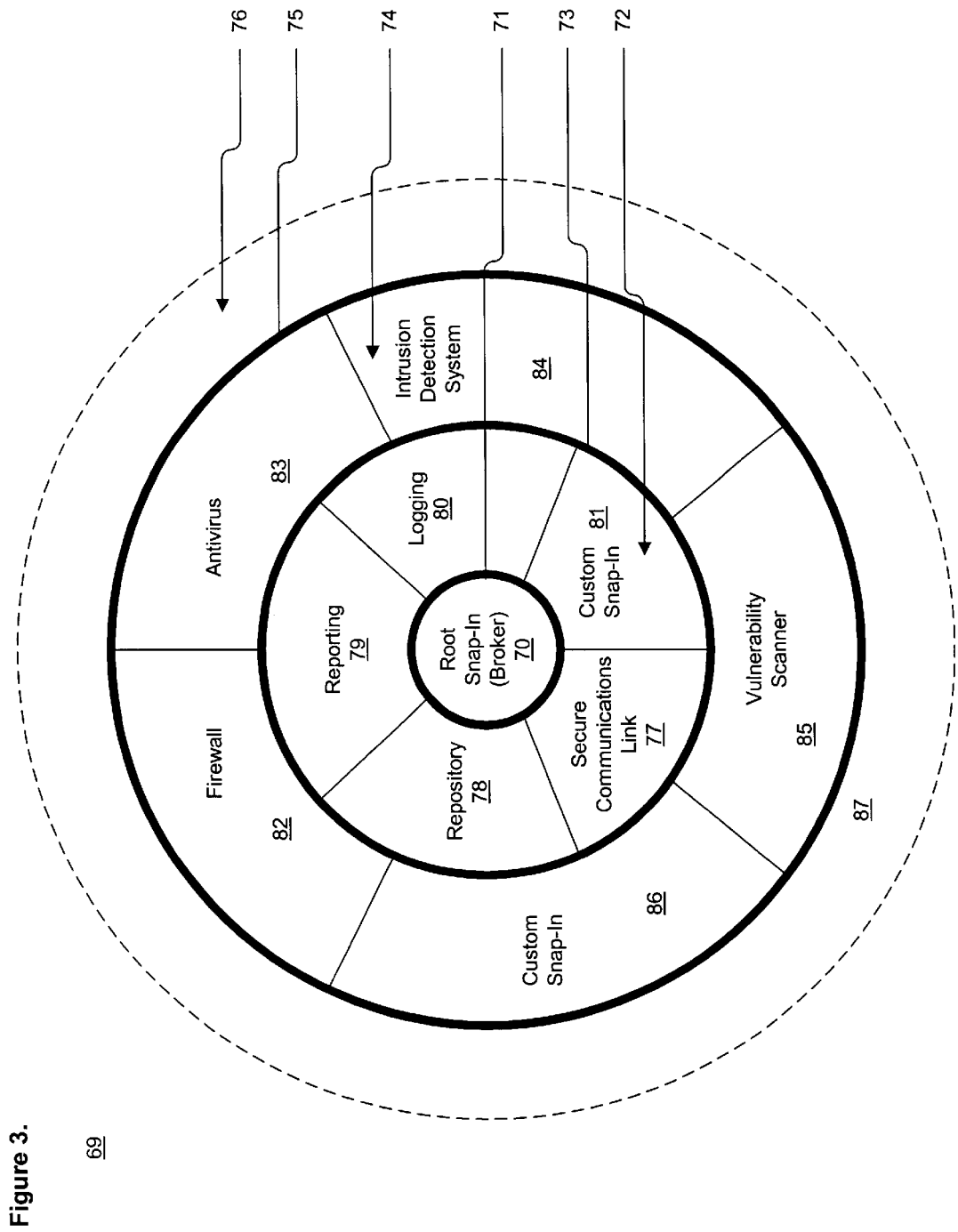
FIG. 3 is a relationship diagram showing the logical layering of the snap-in components of the system of FIG. 1.

FIG. 3 is a relationship diagram 69 showing the logical layering of the snap-in components of the system 10 of FIG. 1. The snap-in components are structured in successive, hierarchical layers 70, 72, 74, 76 with an application programming interface (API) 71, 73, 75 logically separating each layer. The hierarchy is rooted in the security management interface service 20 (shown in FIG. 1) through a root snap-in component 70. This component provides rudimentary user interface functionality via a console window and interfaces to a set of top level snap-in components 72 via a pair of APIs 71. The root snap-in component 70 exposes a console interface implementing a set of browser methods, as further described below with reference to FIG. 8. The top level snap-in components 72 provide security application-independent functionality, such as, secure communications link 77, repository 78, reporting 79, logging 80, and custom top level snap-in component 81. The top-level snap-in components 72 expose a set of snap-in interfaces implementing a set of service methods, as further described below beginning with reference to FIG. 9.

The root snap-in component 70 and top level snap-in components 72 define the basic infrastructure of the security management interface framework. Individual security applications can be grafted onto the basic infrastructure in a similar, layered fashion. Individual security applications interface to the basic infrastructure as security application snap-in components 74. These components configure and control remote security applications (not shown) and include, for example, firewall 82, antivirus scanner 83, intrusion detection system 84, vulnerability scanner 85, and custom security application snap-in component 86. Generally, each security application snap-in component 74 represents only the first layer of a configuration snap-in component tree. Consequently, as needed, the security application snap-in components 74 interface to a set of custom security application snap-in components 76. These components support the security application snap-in components 74 by providing, for example, separate configuration dialogues, and are managed by their respective security application snap-in component 76. Other forms of snap-in component layering are feasible.

Figure 4:
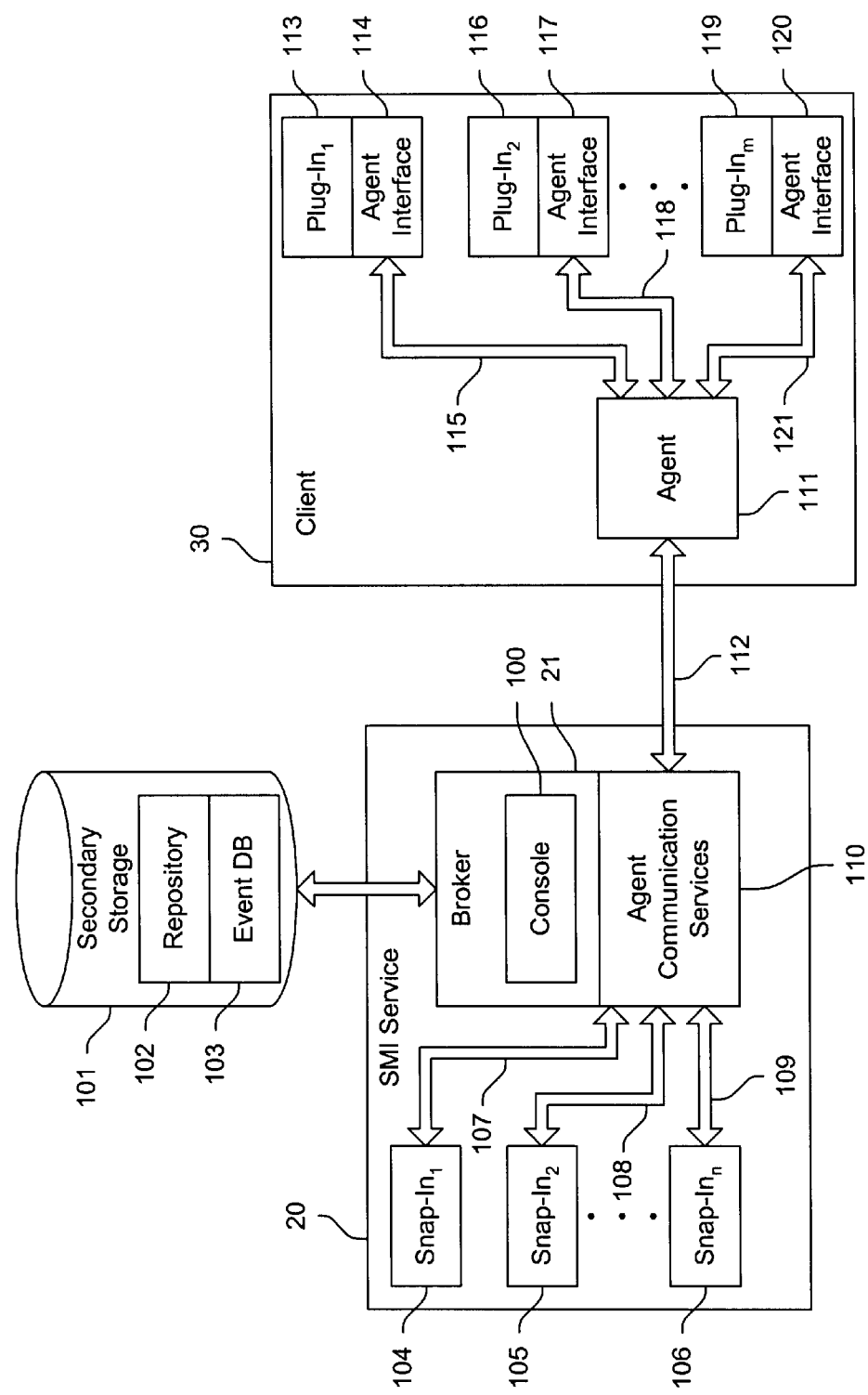
FIG. 4 is a block diagram showing the functional software modules of the system of FIG. 1.

FIG. 4 is a block diagram showing the functional software modules of the system of FIG. 1. Each software module is a computer program written as source code in a conventional programming language, such as the C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

On the server side, the security management interface service 20 consists of four sets of components: snap-in components 104, 105, 106; centralized broker 21; secondary storage 101; and agent communication service snap-in 110. On the client side, there are two sets of components: plug-in components 113, 116, 119; and an agent 111. Snap-in components 104, 105, 106 and plug-in components 113, 116, 119 are described above with reference to FIG. 3.

The centralized broker 21 provides basic management functionality, including exporting a rudimentary user interface via a console window 100 for updating, accessing help functions, and providing proxy services. The snap-in components 104, 105, 106 can asynchronously notify the centralized broker 21 of network events through the console interface, described above with reference to FIG. 3. The secondary storage 101 is used by the security management interface service 20 to store configuration information. In addition, in further embodiments of the described invention, the secondary storage 101 includes a namespace repository 102 for enabling the installation, configuration and management of remote security applications and an event database 103 for storing network event data received from remote clients.

The agent communication service snap-in 110 on the server side works in conjunction with a corresponding agent 111 on the client side for enabling a security application snap-in component 104, 105, 106 to remotely configure and manage an associated plug-in component 113, 116, 119. Each plug-in component 113, 116, 119 must include an agent interface 114, 117, 120 which communicates to the agent 111 though an agent interface 115, 118, 121. In the described embodiment, the agent communication service 110 and agent 111 communicate via an authenticated channel 112 using a proprietary, encrypted packet format, known as an INetPacket. The security management interface service 20 operates in accordance with a sequence of process steps, as further described below beginning with reference to FIG. 6.

Figure 5:
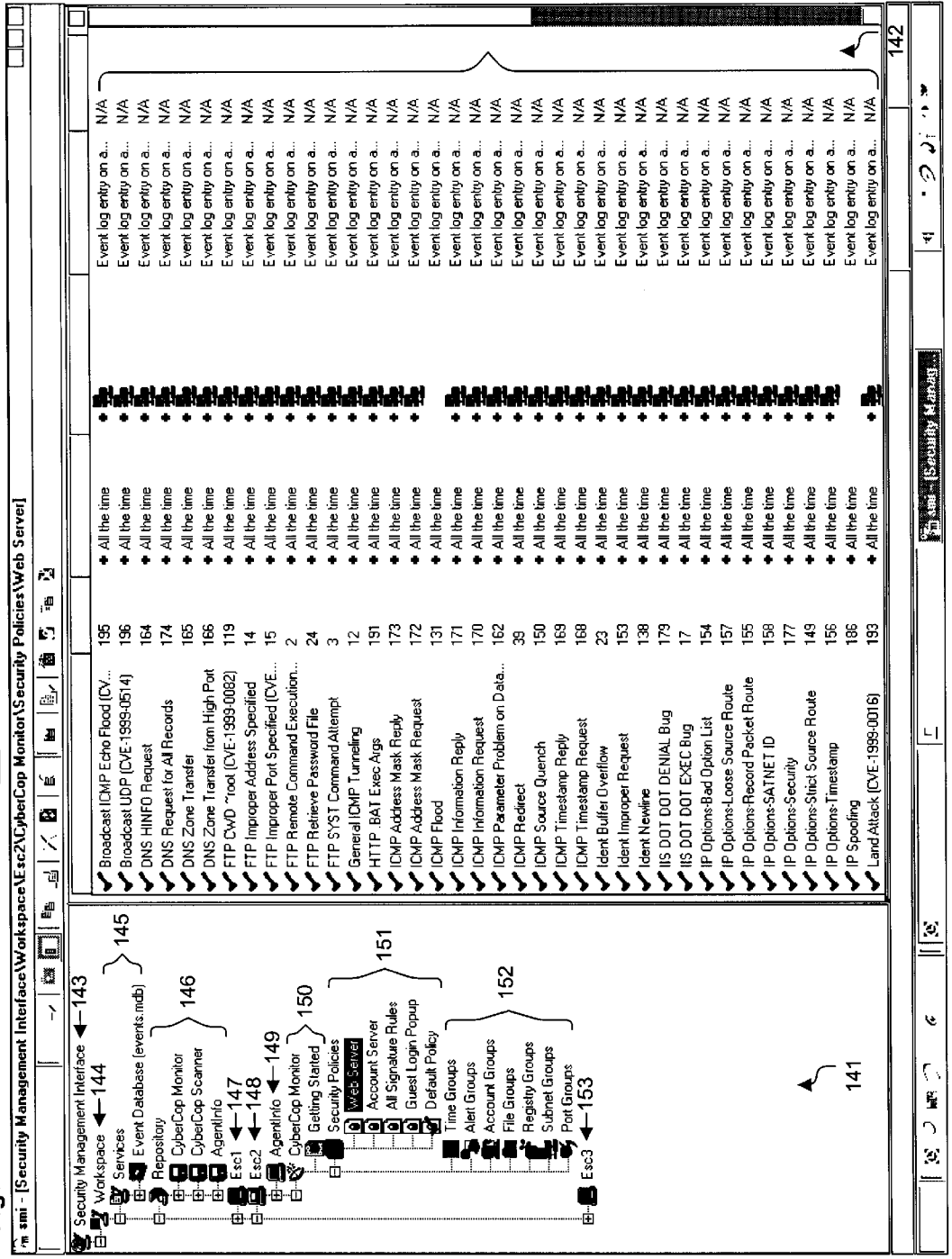
FIG. 5 is a screen shot showing, by way of example, an overall view of the console window of the system of FIG. 1.

FIG. 5 is a screen shot 140 showing, by way of example, an overall view of the console window 100 of the system 10 of FIG. 1. The console window 100 is divided into two views: a left pane 141 showing a tree view which visualizes all nodes available to the user in terms of systems and security applications; and a right pane 142 which presents a configuration dialogue, information screen, or similar view upon the selection of a node in the tree view. The hierarchical structuring of the snap-in components is reflected in the tree view, rooted at "Security Management Interface" node 143 and with the root snap-in component 70 (shown in FIG. 3) shown as "Workspace" node 144. Top level snap-in components 72 are child nodes under the "Workspace" node 144 and include, for instance, "Services" node 145 representing an event database snap-in component; "Repository" node 146 representing a namespace snap-in component; three remote client nodes, "Esc1" node 147, "Esc2" node 148 and "Esc3" node 153. Similarly, the remote client node "Esc2" 148 includes a group of child nodes, each representing security application snap-in components 74, including "AgentInfo" node 149, "CyberCop Monitor" node 150, "Security Policies" node 151, and various other groups 152 for tracking time, alerts, accounts, files, registry data, subnetwork, and port information. Using the tree view, a user can select a node and successively proceed downwards through the hierarchy until an end node is reached. The selection of an end node, such as the "Web Server" end node shown in FIG. 5, causes a configuration, information screen or properties dialogue to be generated and displayed in the right pane 154.

In the described embodiment, the user interface of the security management interface service 20 is based on the Microsoft Management Console, an extensible, common console framework free distributed by Microsoft Corporation, Redmond, Wash. The actual security management interface service 20 presents a generic security application management framework and lacks security application-specific knowledge, such as communications, node dependency, and program functionality. Other types of management frameworks are feasible.

Figure 6:
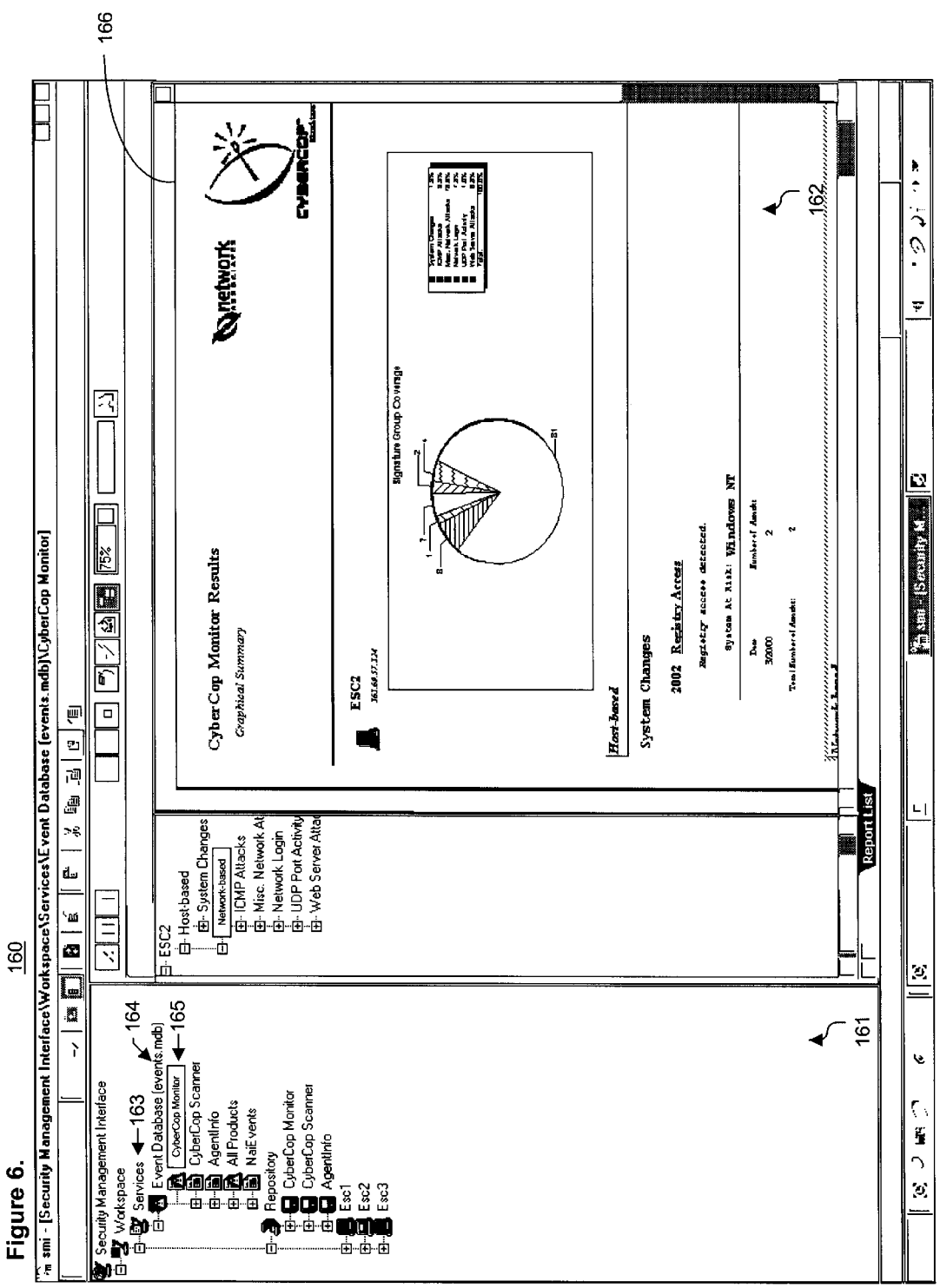
FIG. 6 is a screen shot showing, by way of example, a product-specific view of the console window of the system of FIG. 1.

FIG. 6 is a screen shot 160 showing, by way of example, a product-specific view of the console window 100 of the system 10 of FIG. 1. The left pane 161 presents a tree view of snap-in components as generated by an event viewer top level snap-in component 72, here, shown as "Services" node 163. This component visualizes logged events 164 stored within the event database 103 (shown in FIG. 4), represented as "Event Database" node 164. As shown, the "CyberCop Monitor" node 165 is selected and a graphical summary 166 is presented. Other forms of visualization are feasible.

Figure 7:
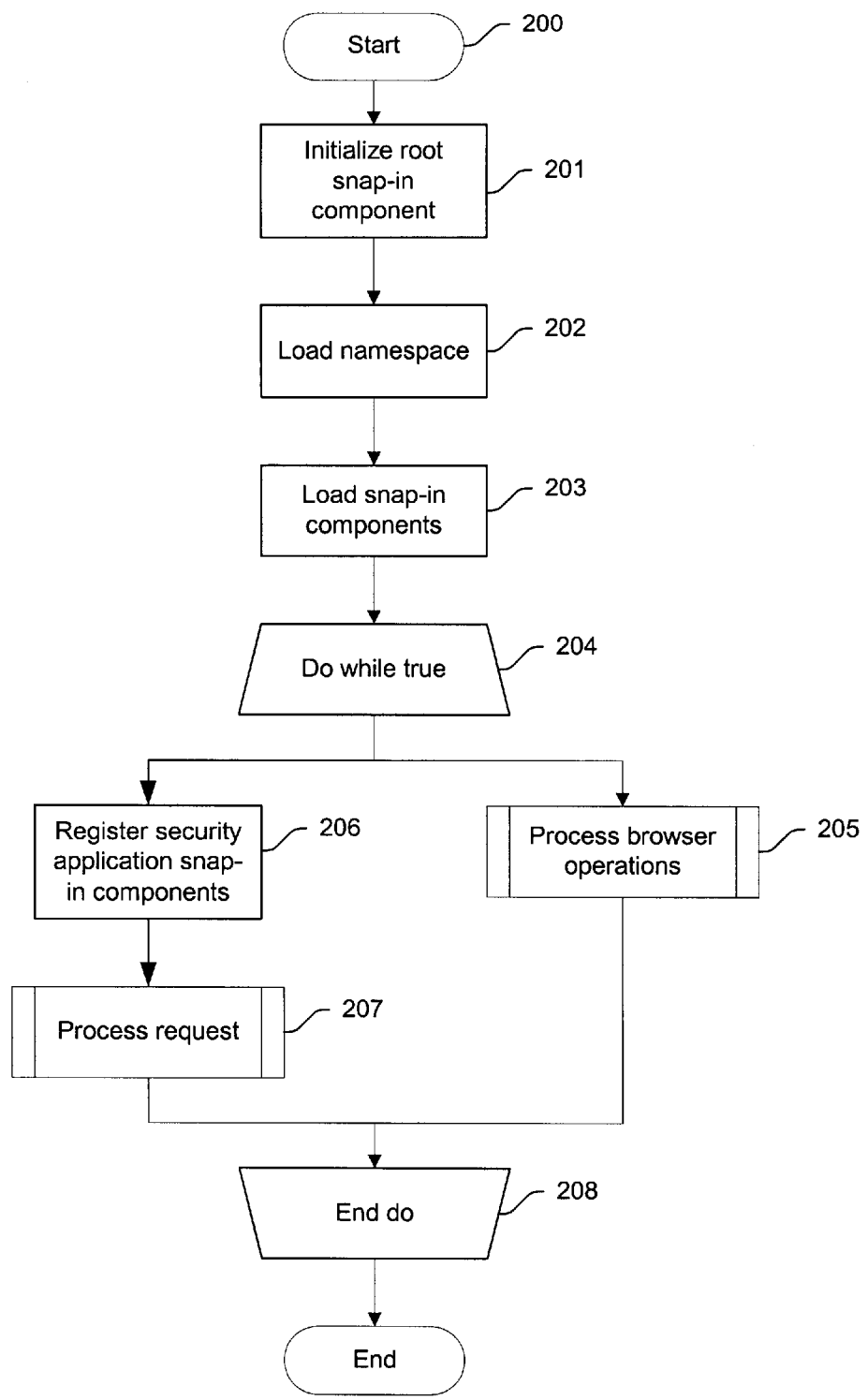
FIG. 7 is a flow diagram showing a process for brokering a plurality of security applications using a modular framework in a distributed computing environment in accordance with the present invention.

FIG. 7 is a flow diagram showing a process for brokering a plurality of security applications 200 using a modular framework in a distributed computing environment in accordance with the present invention. At least one snap-in component 39 (shown in FIG. 2) interfaces to a security application running on a client using the centralized broker 21 to manage and provide centralized services to the security application. After completion of initialization (blocks 201–203), operations generated by the centralized broker 21 and the snap-in components 39 are executed as separate threads in an iterative loop (blocks 204–208).

Initialization begins with starting the root snap-in component 70 (block 201). As discussed above with reference to FIG. 3, all snap-in components are structured in a hierarchical fashion with the root snap-in component 70 at the top of the hierarchy. Top level snap-in components 72 are defined in the namespace of the security management interface service 20 while security application snap-in components 74 and custom security application snap-in components 76 are created dynamically at runtime. Thus, the namespace is loaded (block 202) and each top level snap-in component 72 is loaded using the location specified in the namespace (block 203). Processing then begins.

The security management interface service 20 processes tasks in an iterative processing loop (blocks 204–208) which includes two, preferably parallel, processing threads. The first processing thread processes browser operations which are calls on the methods implemented by the console interface (block 205), as further described below with reference to FIG. 8. The second processing thread dynamically registers each security application snap-in component 74 (block 206) and, based on the requested operation, executes a corresponding top level snap-in component 72 (block 207), as further described below with reference to FIG. 9. Tasks are continually processed until the user terminates the service.

In the described embodiment, security application snap-in component 72 registration requires three steps: enumerating all products on the associated remote system, concatenating the appropriate class identifier (CLSID), and retrieving extended attributes. For efficiency, a separate execution thread is used to allow the user to continue with other tasks while the requested top level snap-in component 72 is being enumerated and retrieved.

Figure 8:
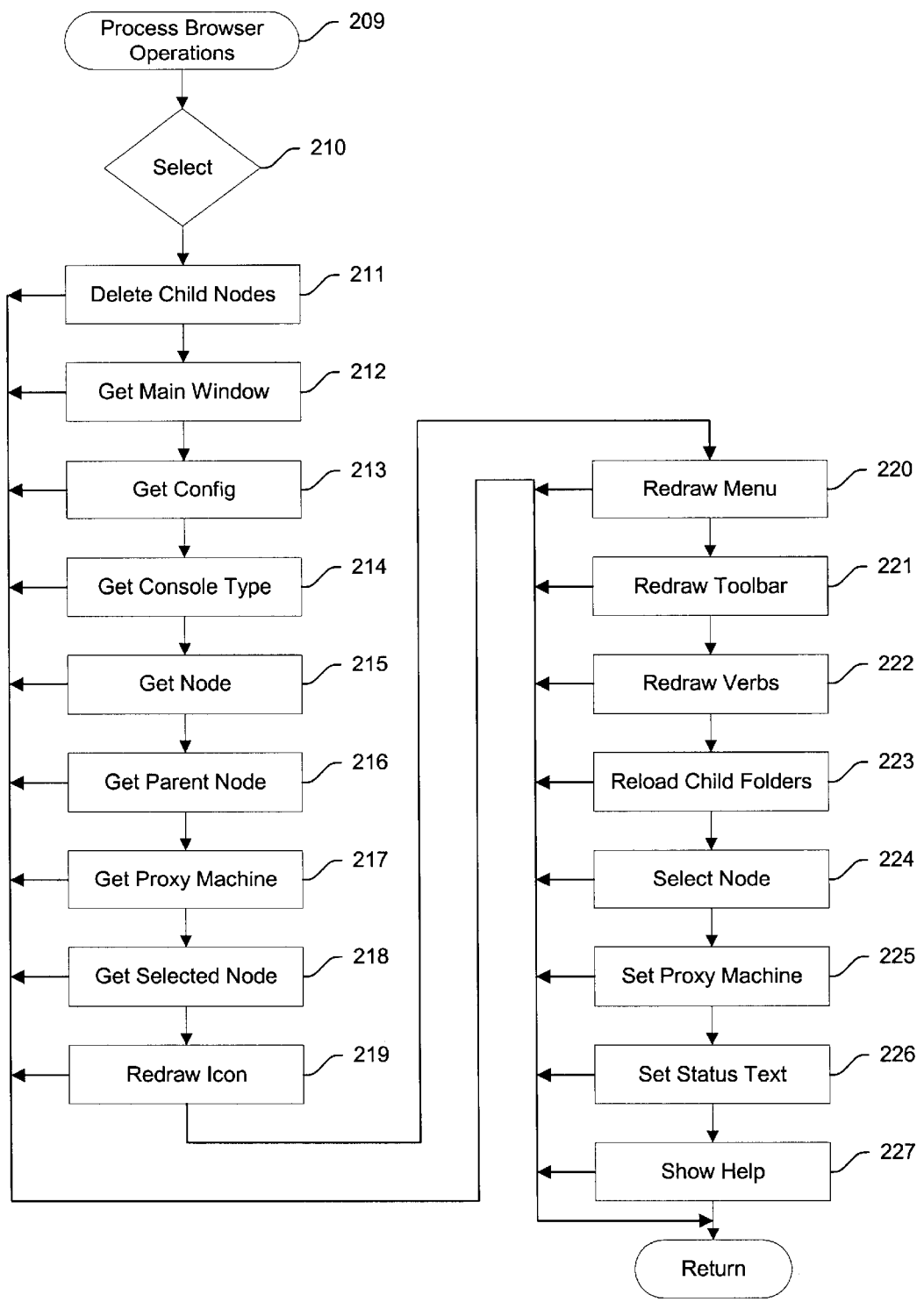
FIG. 8 is a flow diagram showing the routine for processing browser operations for use in the process of FIG. 7.

FIG. 8 is a flow diagram showing the routine for processing browser operations 211 for use in the process of FIG. 7. The purpose of this routine is to process a call on a method implemented in the console interface, IConsoleBrowser, of the security management interface service 20. The appropriate method is selected (block 210) and executed to perform an operation as follows. DeleteChiudNodes (block 211) forces the console window 100 (shown in FIG. 4) to immediately unload and release all nodes beneath a specified folder and to collapses the tree at that point. GetMainWindow (block 212) returns global settings for the console window 100, including encryption settings and general user interface behavior. GetConsoleType (block 214) returns the type of the host console window 100 upon which the requesting snap-in component 72 is running. GetNode (block 215) returns a pointer to the folder interface, ISnapInFolder, of the requesting snap-in component 72. GetParentNode (block 216) returns a pointer to the folder interface, ISnapInFolder, of the parent of the requesting snap-in component 72. GetProxyMachine (block 217) returns the currently active proxy machine name. GetSelectedNode (block 218) returns a pointer to the folder interface, ISnapInFolder, of the currently selected node. RedrawIcon (block 219) instructs the security manager interface service 20 for the user interface icon for a node and redraws the list and tree views in the console window 100. RedrawMenu (block 220) instructs the security manager interface service 20 for the pull down menu for an active view and redraws the pull down menu in the console window 100. RedrawToolbar (block 221) instructs the security manager interface service 20 for the toolbar for an active view and redraws the toolbar in the console window 100. RedrawVerbs (block 222) instructs the security manager interface service 20 for the verbs for an active view and redraws the verbs in the console window 100. ReloadChildFolders (block 223) instructs the security manager interface service 20 to reload a folder and any immediate subfolders. SelectNode (block 224) instructs the security manager interface service 20 to select a specific node and to show the corresponding view window. SetProxyMachine (block 225) sets a new proxy machine to be used for communication. SetStatusText (block 226) sets and displays status text about a folder in the frame window status line of the container for that folder. ShowHelp (block 227) instructs the security manager interface service 20 to display help for the active view.

Figure 9:
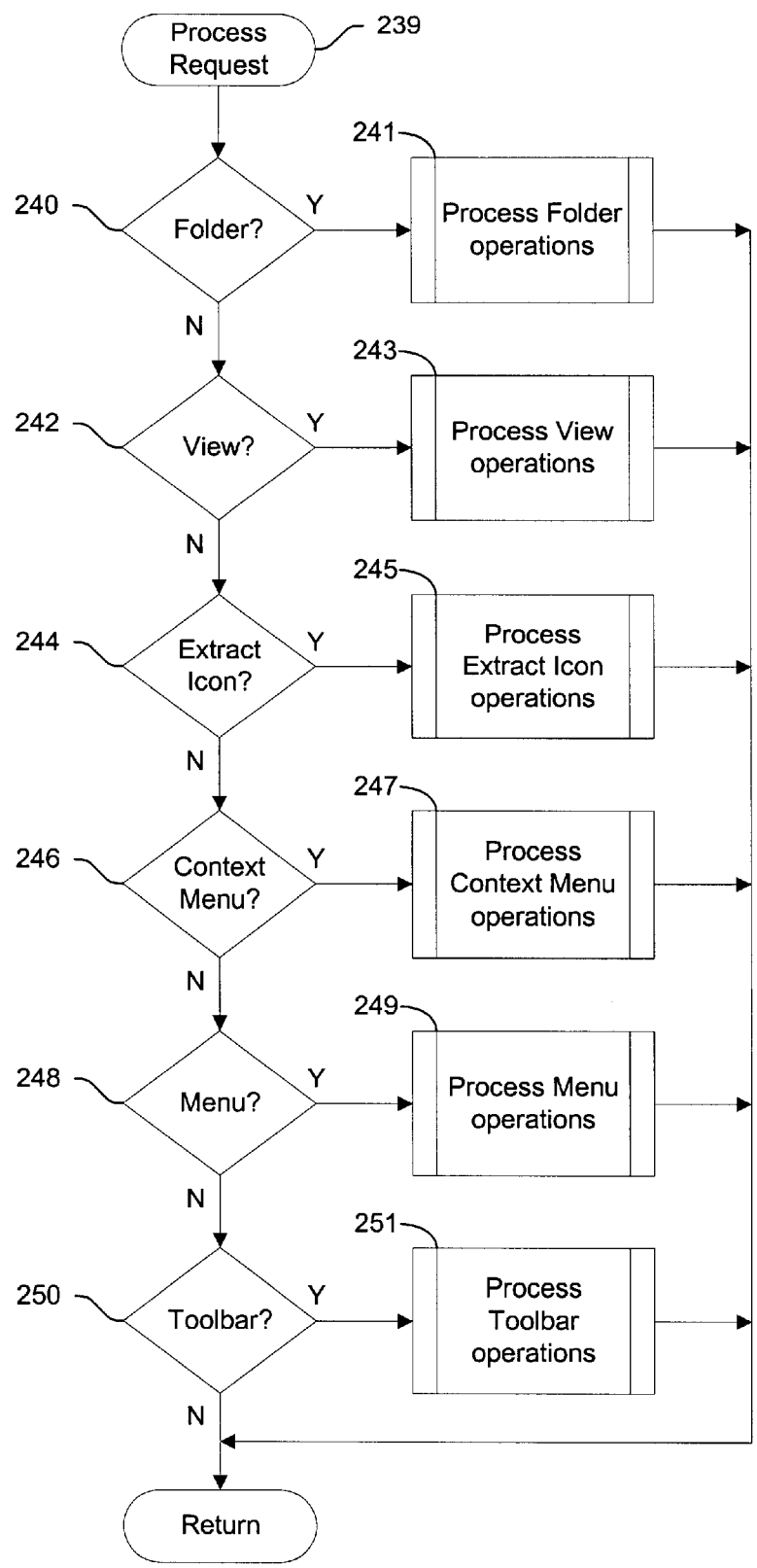
FIG. 9 is a flow diagram showing the routine for executing a snap-in component for use in the process of FIG. 7.

FIG. 9 is a flow diagram showing the routine for executing a snap-in component 239 for use in the process of FIG. 7. The purpose of this routine is to select the appropriate snap-in component interface based on the requested operation and to execute that operation by making a call on the method implemented in the selected interface. In the described embodiment, each snap-in component exposes six interfaces for executing operations relating to folders, ISnapInFolder (blocks 240–241); views, ISnapInView (blocks 242–243); extracting icons, ISnapInExtractIcon (blocks 244–245); context menus, ISnapInContextMenu (block 246–247); menus, ISnapInMenu (blocks 248–249); and toolbars, ISnapInToolbar (blocks 250–251). Thus, a call on the folder interface (block 240) requires the processing of folder operations (block 241), as further described below with reference to FIG. 10. A call on the view interface (block 242) requires the processing of view operations (block 243), as further described below with reference to FIG. 1. A call on the extract icon interface (block 244) requires the processing of extract icon operations (block 245), as further described below with reference to FIG. 12. A call on the context menu interface (block 246) requires the processing of context menu operations (block 247), as further described below with reference to FIG. 13. A call on the menu interface (block 248) requires the processing of menu operations (block 249). However, this interface is not called directly and is only used by the security management interface service 20 when a menu is to be displayed for a specific node. Finally, a call on the toolbar interface (block 250) requires the processing of toolbar operations (block 251), as further described below with reference to FIG. 14. The routine then returns.

Figure 10:
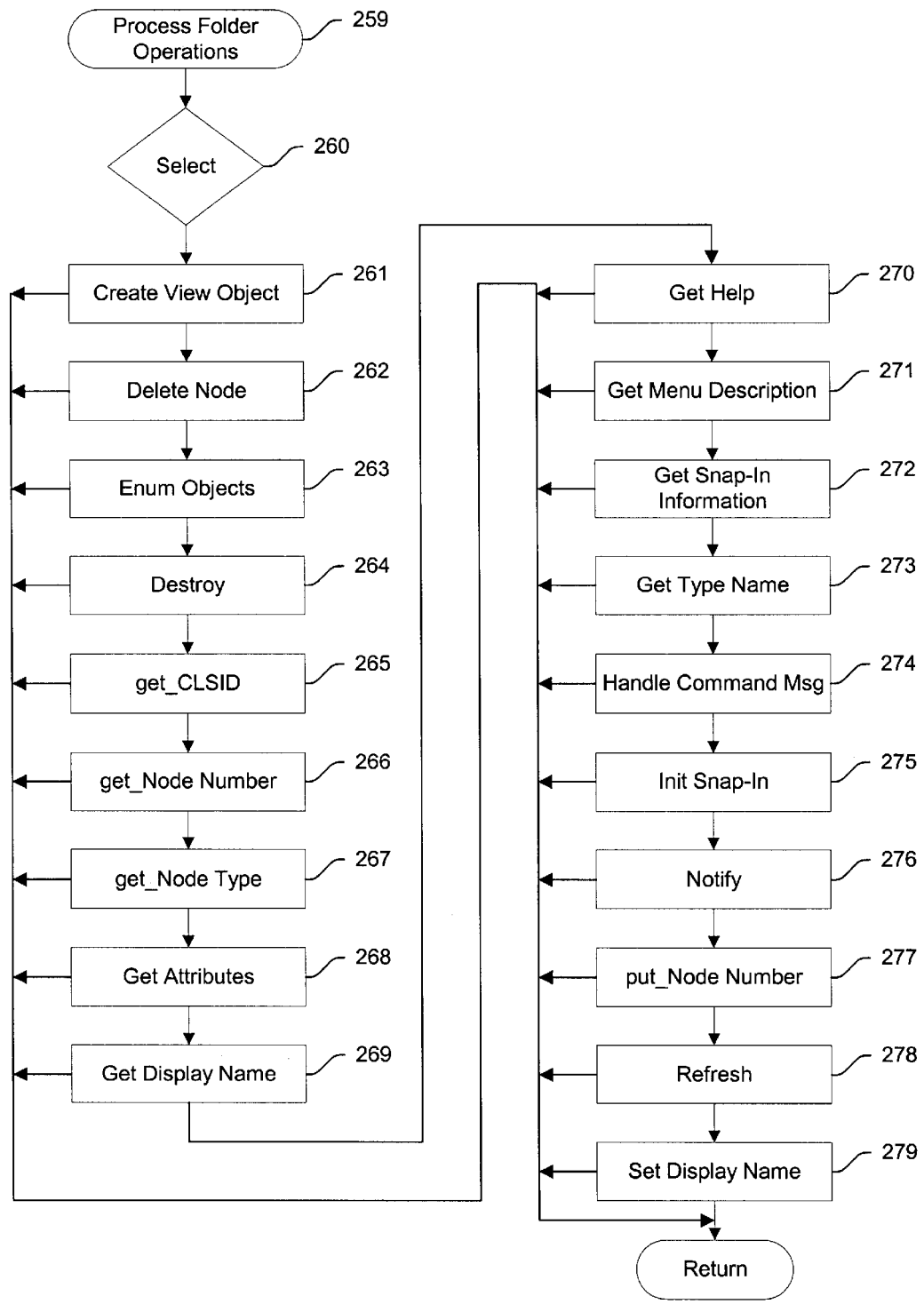
FIG. 10 is a flow diagram showing the routine for processing folder operations for use in the routine of FIG. 9.

FIG. 10 is a flow diagram showing the routine for processing folder operations 259 for use in the routine of FIG. 9. The purpose of this routine is to process a call on a method implemented in the folder interface, ISnapInFolder, of the snap-in components 72. The appropriate method is selected (block 260) and executed to perform an operation as follows. CreateViewObject (block 261) creates a view object attached to the folder for the requesting snap-in component 72. DeleteNode (block 262) notifies a node that the user has chosen the "Delete" command. EnumObjects (block 263) returns a pointer to an enumerator object that can be used to enumerate all folders contained within an object. Destroy (block 264) notifies a node that the current snap-in component folder is about to be destroyed when the user closes the security management interface service 20. Get_CLSID (block 265) returns the class identifier of the current node. Get_NodeNumber (block 266) returns the unique node identifier describing the position of the snap-in component 72 within the database. Get_NodeType (block 267) returns the type assigned to the current folder. GetAttributes (block 268) returns the attributed assigned to the current folder. GetDisplayName (block 269) returns user-readable text identifying the snap-in component 72 and context. GetHelp (block 270) retrieves both the path of the help file and the associated help page of the current node. GetMenuDescription (block 271) returns a short description for the specified menu item. GetSnapInInformation (block 272) returns the product identifier and version of the snap-in component 72. GetTypeName (block 273) retrieves a textual description of the type of the current node. HandleCommandMsg (block 274) handles messages for pull down menus, context menus, tool buttons, and other commands. InitSnapIn (block 275) connects the folder of the current snap-in component 72 with the console interface, IConsoleBrowser and sets both storage and session interface pointers. Notify (block 276) is called by the security management interface service 20 when an event concerning the current snap-in component 72 occurs. Put_NodeNumber (block 277) sets a unique node identifier describing the position of the current snap-in component 72 within the database. Refresh (block 278) notifies a node that the user has chosen the "Refresh" command. SetDisplayName (block 279) sets user-readable text identifying the current snap-in component 72 and context.

Figure 11:
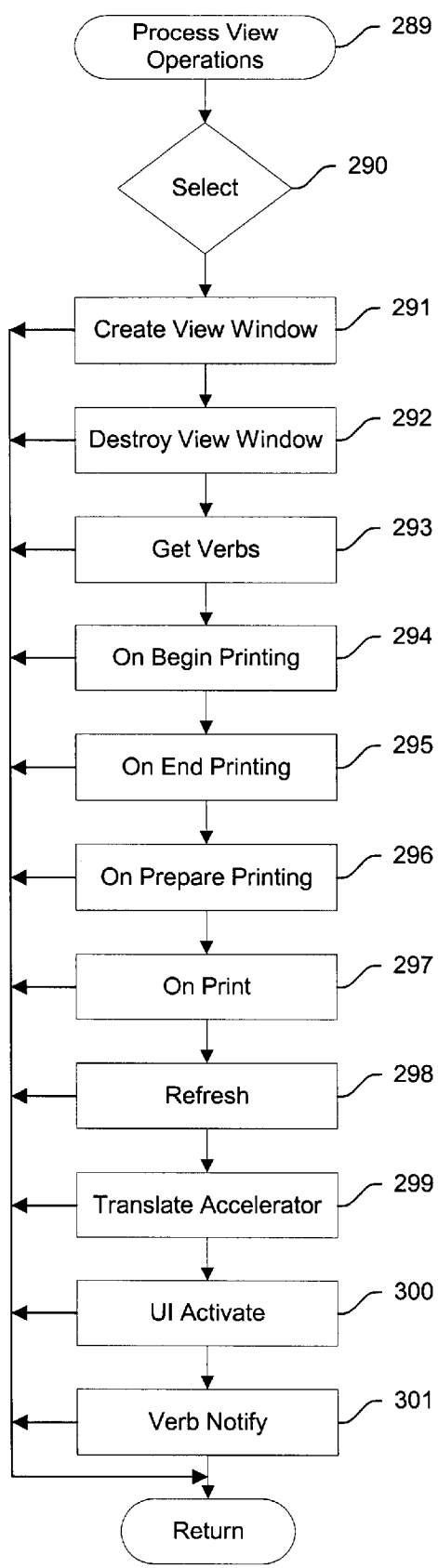
FIG. 11 is a flow diagram showing the routine for processing view operations for use in the routine of FIG. 9.

FIG. 11 is a flow diagram showing the routine for processing view operations 289 for use in the routine of FIG. 9. The purpose of this routine is to process a call on a method implemented in the view interface, ISnapInView, of the snap-in components 72. The appropriate method is selected (block 290) and executed to perform an operation as follows. CreateViewWindow (block 291) creates and displays a view window in the right pane of the console window 100 (shown in FIG. 4). DestroyViewWindow (block 292) destroys a view window previously created with the CreateViewWindow( ) method. GetVerbs (block 293) returns all verbs supported by the view of the current node. OnBeginPrinting (block 294) is called by the security management interface service 20 at the beginning of a print or print preview job. OnEndPrinting (block 295) is called by the security management interface service 20 after a print or print preview job. OnPreparePrinting (block 296) is called by the security management interface service 20 before a print or print preview job. OnPrint (block 297) is called by the security management interface service 20 to print or preview a page of a document. Refresh (block 298) causes the window to redraw. TranslateAccelerator (block 299) translates accelerator key strokes when the view of a node has the focus. UIActivate (block 300) is called by the console window 100 every time the activation state of the current view changes due to an event not initiated by the console window 100. VerbNotify (block 301) notifies a node that one of the verbs returned by the GetVerbso method has been chosen by the user.

Figure 12:
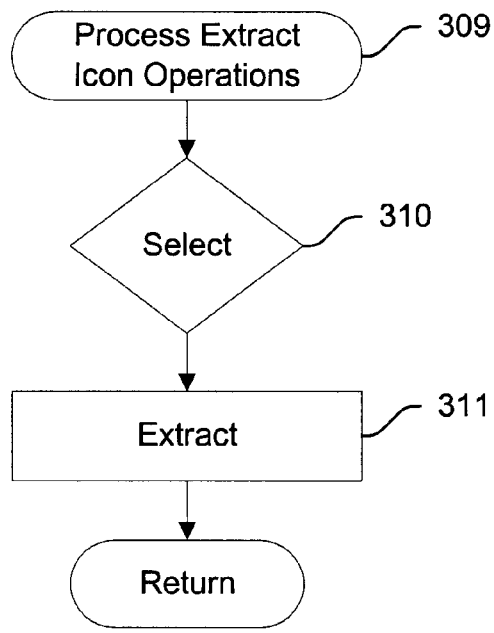
FIG. 12 is a flow diagram showing the routine for processing extract icon operations for use in the routine of FIG. 9.

FIG. 12 is a flow diagram showing the routine for processing extract icon operations 309 for use in the routine of FIG. 9. The purpose of this routine is to process a call on a method implemented in the extract icon interface, ISnapInExtractIcon, of the snap-in components 72. The appropriate method is selected (block 310) and executed to perform an operation as follows. Extract (block 311) extracts an icon image for the current node.

Figure 13:
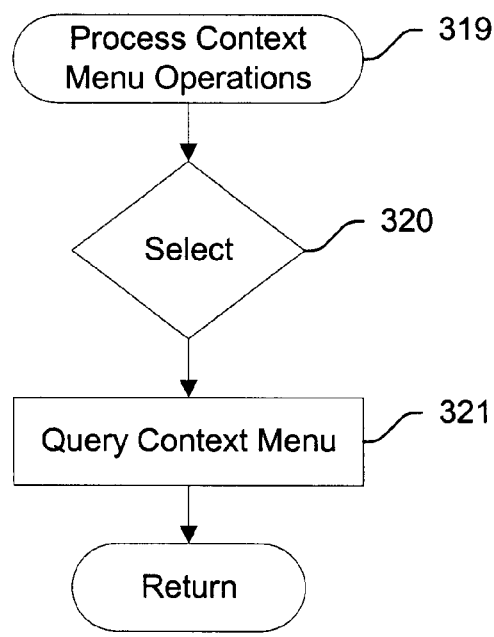
FIG. 13 is a flow diagram showing the routine for processing context menu operations for use in the routine of FIG. 9.

FIG. 13 is a flow diagram showing the routine for processing context menu operations 319 for use in the routine of FIG. 9. The purpose of this routine is to process a call on a method implemented in the context menu interface, ISnapInContextMenu, of the snap-in components 72. The appropriate method is selected (block 320) and executed to perform an operation as follows. QueryContextMenu (block 321) adds menu items to the context menu.

Figure 14:
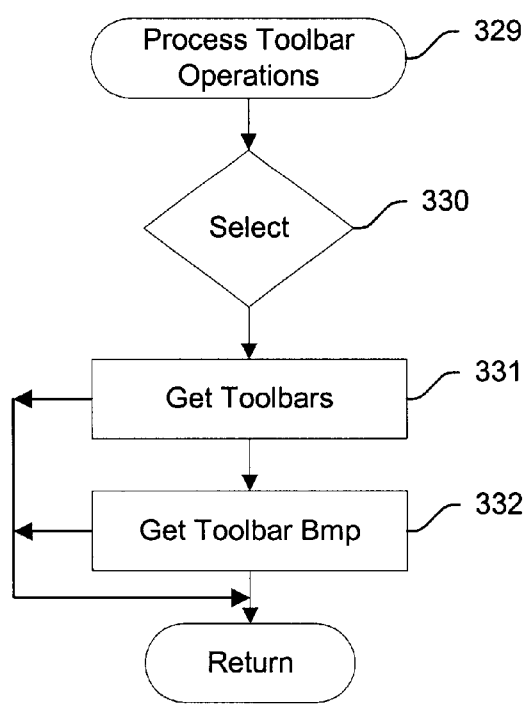
FIG. 14 is a flow diagram showing the routine for processing toolbox operations for use in the routine of FIG. 9.

FIG. 14 is a flow diagram showing the routine for processing toolbox operations 329 for use in the routine of FIG. 9. The purpose of this routine is to process a call on a method implemented in the toolbox interface, ISnapInToolbox, of the snap-in components 72. The appropriate method is selected (block 330) and executed to perform an operation as follows. GetToolbars (block 331) returns information about the tool buttons created with the GetToolbarBmp( ) method. GetToolbarBmp (block 332) instructs the snap-in component 72 to create a bitmap containing all buttons needed for the toolbar.

While the invention has been particularly shown and described as referenced to the embodiments thereof, those skilled in the art will understand that the foregoing and other changes in form and detail may be made therein without departing from the spirit and scope of the invention.

What is claimed is:

1. A system for brokering a plurality of security applications using a centralized broker in a distributed computing environment, comprising:

a centralized broker executing on a designated system within the distributed computing environment;

a set of snap-in components each performing a common management task sharable by a plurality of security applications;

a console interface exposed by the centralized broker, the console interface implementing a plurality of browser methods which each define an browser function which can be invoked by each snap-in component, wherein the browser function comprises at least one member selected from the group comprising integrating snap-in components, accessing a namespace, embedding user interface elements, and handling window messages;

a set of snap-in interfaces exposed by each snap-in component, each snap-in interface implementing a plurality of service methods which each define a user-interface function which can be invoked by the centralized broker, wherein the user-interface function comprises at least one member selected from the group comprising creating and managing folder objects, creating and managing view windows, retrieving icons, merging a context menu, creating and managing menus, and adding items to toolbars; and at least one security application centrally brokered by the centralized broker by interfacing each security application to the centralized broker through the snap-in components, managing each security application by invoking at least one such browser method via the console interface, and centrally servicing a plurality of the security applications by invoking at least one such service method via at least one such snap-in interface.

2. A system according to claim 1, further comprising:

a console window running on the centralized broker through which individual controls within each of the security applications can be configured using the browser methods.

3. A system according to claim 1, further comprising:

each such security application interfacing as a plug-in component to the centralized broker.

4. A system according to claim 1, further comprising:

at least one security application executed locally on the designated system; and the at least one local security application brokered as a local process running on the designated system.

5. A system according to claim 1, further comprising:

at least one security application executed remotely on a remote system within the distributed computing environment; and the at least one remote security application brokered as a remote process running on the remote system.

6. A system according to claim 5, wherein at least one such snap-in component comprises an agent communication service, further comprising:

an agent running on the remote system interfaced to the at least one remote security application; and the agent communicating with the agent communication service through which the centralized broker manages the at least one remote security application.

7. A system according to claim 1, further comprising:

an event database maintained on each system within the distributed computing environment;

event data from at least one such security application stored in the event database and retrieved from the event database into the centralized broker for use by one or more of the snap-in components.

8. A system according to claim 7, further comprising:

a plurality of event databases formed into an event database hierarchy, comprising:

one such event database designated as a root event database;

each of the other such event databases structured into one or more levels of child event databases;

the stored event data from the child event databases cascaded successively upward to the root event database; and retrieving the cascaded stored event data from the root event database into the centralized broker.

9. A system according to claim 1, wherein each security application comprises at least one member selected from the group comprising a firewall, an intrusion detection system, and antivirus scanner.

10. A system according to claim 1, wherein the set of communication interfaces is COM-compliant.

11. A process for brokering a plurality of security applications using a centralized broker in a distributed computing environment, comprising:
   executing a centralized broker on a designated system within the distributed computing environment;
   providing a set of snap-in components each performing a common management task sharable by a plurality of security applications;
   exposing a console interface from the centralized broker, the console interface implementing a plurality of browser methods which each define an browser function which can be invoked by each snap-in component, wherein the browser function comprises at least one member selected from the group comprising integrating snap-in components, accessing a namespace, embedding user interface elements, and handling window messages;
   exposing a set of snap-in interfaces from each snap-in component, each snap-in interface implementing a plurality of service methods which each define a user-interface function which can be invoked by the centralized broker, wherein the user-interface function comprises at least one member selected from the group comprising creating and managing folder objects, creating and managing view windows, retrieving icons, merging a context menu, creating and managing menus, and adding items to toolbars; and
   brokering one or more security applications through the centralized broker, comprising:
      interfacing each security application to the centralized broker through the snap-in components;
      managing each security application by invoking at least one such browser method via the console interface; and
      centrally servicing a plurality of the security applications by invoking at least one such service method via at least one such snap-in interface.

12. A process according to claim 11, further comprising:
   running a console window on the centralized broker through which individual controls within each of the security applications can be configured using the browser methods.

13. A process according to claim 11, further comprising:
   interfacing each such security application as a plug-in component to the centralized broker.

14. A process according to claim 11, further comprising:
   executing at least one security application locally on the designated system; and
   brokering the at least one local security application as a local process running on the designated system.

15. A process according to claim 11, further comprising:
   executing at least one security application remotely on a remote system within the distributed computing environment; and
   brokering the at least one remote security application as a remote process running on the remote system.

16. A process according to claim 15, wherein at least one such snap-in component comprises an agent communication service, further comprising:
   interfacing an agent running on the remote system to the at least one remote security application; and
   communicating with the agent via the agent communication service through which the centralized broker manages the at least one remote security application.

17. A process according to claim 11, further comprising:
   maintaining an event database on each system within the distributed computing environment;
   storing event data from at least one such security application in the event database; and
   retrieving the stored event data from the event database into the centralized broker for use by one or more of the snap-in components.

18. A process according to claim 17, further comprising:
   forming a plurality of event databases into an event database hierarchy, comprising:
      designating one such event database as a root event database;
      structuring each of the other such event databases into one or more levels of child event databases;
      cascading the stored event data from the child event databases successively upward to the root event database; and
   retrieving the cascaded stored event data from the root event database into the centralized broker.

19. A process according to claim 11, wherein each security application comprises at least one member selected from the group comprising a firewall, an intrusion detection system, and antivirus scanner.

20. A process according to claim 11, wherein the set of communication interfaces is COM-compliant.

21. A computer-readable storage medium holding code for brokering a plurality of security applications using a centralized broker in a distributed computing environment, comprising:
   executing a centralized broker on a designated system within the distributed computing environment;
   providing a set of snap-in components each performing a common management task sharable by a plurality of security applications;
   exposing a console interface from the centralized broker, the console interface implementing a plurality of browser methods which each define an browser function which can be invoked by each snap-in component, wherein the browser function comprises at least one member selected from the group comprising integrating snap-in components, accessing a namespace, embedding user interface elements, and handling window messages;
   exposing a set of snap-in interfaces from each snap-in component, each snap-in interface implementing a plurality of service methods which each define a user-interface function which can be invoked by the centralized broker, wherein the user-interface function comprises at least one member selected from the group comprising creating and managing folder objects, creating and managing view windows, retrieving icons, merging a context menu, creating and managing menus, and adding items to toolbars; and
   brokering one or more security applications through the centralized broker, comprising:
      interfacing each security application to the centralized broker through the snap-in components;
      managing each security application by invoking at least one such browser method via the console interface; and centrally servicing a plurality of the security applications by invoking at least one such service method via at least one such snap-in interface.

22. A storage medium according to claim 21, further comprising:
running a console window on the centralized broker through which individual controls within each of the security applications can be configured using the browser methods.

23. A storage medium according to claim 21, further comprising:
interfacing each such security application as a plug-in component to the centralized broker.

24. A storage medium according to claim 21, further comprising:
executing at least one security application locally on the designated system; and
brokering the at least one local security application as a local process running on the designated system.

25. A storage medium according to claim 21, further comprising:
executing at least one security application remotely on a remote system within the distributed computing environment; and
brokering the at least one remote security application as a remote process running on the remote system.

26. A storage medium according to claim 25, wherein at least one such snap-in component comprises an agent communication service, further comprising:
interfacing an agent running on the remote system to the at least one remote security application; and
communicating with the agent via the agent communication service through which the centralized broker manages the at least one remote security application.

27. A storage medium according to claim 21, further comprising:
maintaining an event database on each system within the distributed computing environment;
storing event data from at least one such security application in the event database; and
retrieving the stored event data from the event database into the centralized broker for use by one or more of the snap-in components.

28. A storage medium according to claim 27, further comprising:
forming a plurality of event databases into an event database hierarchy, comprising:
designating one such event database as a root event database;
structuring each of the other such event databases into one or more levels of child event databases;
cascading the stored event data from the child event databases successively upward to the root event database; and
retrieving the cascaded stored event data from the root event database into the centralized broker.

\* \* \* \* \*